United States Patent

Whitten

[15] 3,680,114

[45] July 25, 1972

[54] MODULATION FORMAT FOR SIGNAL ARRIVE TIME DETERMINATION UTILIZING DIFFERENTIAL CODE LOGIC

[72] Inventor: James R. Whitten, Scotia, N.Y.
[73] Assignee: General Electric Company
[22] Filed: Dec. 8, 1969
[21] Appl. No.: 882,987

[52] U.S. Cl. .................................. 343/100 CL, 343/6.5 R
[51] Int. Cl. ........................................... H04b 7/00
[58] Field of Search .................. 325/133, 65; 343/100 CL

[56] References Cited

UNITED STATES PATENTS 3,317,838   5/1967   Ham ............................... 325/133 X
3,483,472   12/1969   Kinkel et al. ..................... 325/65 X Primary Examiner—Rodney D. Bennett, Jr.
Assistant Examiner—J. M. Potenza
Attorney—John F. Ahern, Paul A. Frank, Julius J. Zaskalicky, Frank L. Neuhauser, Oscar B. Waddell and Joseph B. Forman

[57] ABSTRACT

A method of modulating a signal is disclosed wherein ancillary information is encoded on a sub-carrier so that the information and the time of arrival of the signal may be simultaneously determined. When the ancillary information is an identification code, the technique may be used in timing, vehicle location, navigation systems, and the like. In a receiving station, a portion of the signal is detected and used to demodulate the remainder of the signal which is then code filtered and correlated with the detected signal to obtain arrival time.

7 Claims, 2 Drawing Figures

Inventor
James R. Whitten
by Paul A. Frank
His Attorney

MODULATION FORMAT FOR SIGNAL ARRIVE TIME DETERMINATION UTILIZING DIFFERENTIAL CODE LOGIC

This invention relates to a method of modulating a transmitted signal so that at a receiving station the precise arrival time of the transmitted signal may be determined. In timing and vehicle location systems, it is desirable to know the precise travel time from one or more known locations to one or more unknown locations, whereby the positions of the unknown locations may be determined. When the locations of a plurality of vehicles are desired, it is necessary to interrogate each vehicle separately, thereby requiring an identification code for each vehicle. In one form of timing system in the prior art, after a vehicle is identified, a signal locally generated in the vehicle must be synchronized with a transmitted signal from the known location before the time of arrival and location can be determined.

All of the above operations, identification and synchronization, plus inherent delays in the vehicle receiver itself are what may be called "instrument delays", i.e., delays not caused by the distance separating the transmitter and receiver. All of these instrument delays must be calibrated out of the system if accurate measurements of time of arrival and location are to be made.

It is, therefore, an object of the present invention to obviate some of the instrument delays in a time of arrival or vehicle location system.

It is a further object of the present invention to eliminate the need for synchronizing a locally generated signal.

It is another object of the present invention to provide an arrival time measuring and vehicle location system in which identification and time of arrival are obtained simultaneously.

It is a further object of the invention to provide a modulation technique whereby time of signal arrival and other ancillary information may be simultaneously recovered at a receiving station.

The foregoing objects are achieved in the present invention by phase shift modulating a sub-carrier signal to encode thereon the ancillary information. The modulated sub-carrier is then used to modulate an RF carrier signal in any desired manner to provide the transmitted signal at the desired channel frequency. At a receiving station, the sub-carrier frequency is recovered by utilizing the significant amount of energy at the second harmonic of the sub-carrier frequency. The received signal, after limiting and channel demodulation, is square-law detected and divided in half in frequency to provide the original sub-carrier signal. This recovered sub-carrier signal is thus synchronous with the transmitted sub-carrier and is used to product demodulate the received code waveform directly and without significant delay. The demodulated coded waveform is then passed to a correlator where it is compared with stored coded information, e.g., vehicle identification. The recovered sub-carrier is then coincidence detected with an identification signal from the correlator to provide a precise indication of arrival time.

The modulation and reception as described above may be utilized in a vehicle identification and location system. In one such system, as described in U.S. Pat. No. 3,384,891, a base station transmits a "ranging signal" to a satellite station, whose location is known, which retransmits the signal to a vehicle whose location is to be determined. The vehicle then repeats the signal which is then retransmitted by the satellite to the base station. From the time interval between transmission and reception by the satellite a given range is obtained from the satellite to the vehicle. The process is then repeated with a satellite at a second location. From the two ranges, the vehicle's location is determined as being at one of two places. Depending upon the use to which the system is put, one of the possible positions can be dismissed as unlikely, or a third satellite location can be used to eliminate ambiguity. It should be understood "satellite" is used in its generic sense, not necessarily meaning a vehicle in orbit about the ear or some other celestial body.

As can be seen, any reduction in the time it takes to identify and locate the vehicle whose position is to be determined would greatly enhance the operation of the system and increase the number of vehicles that can be identified and located in a given amount of time.

The details of the invention may be better understood by considering the following detailed description in conjunction with the attached drawings in which.

Figure 1:
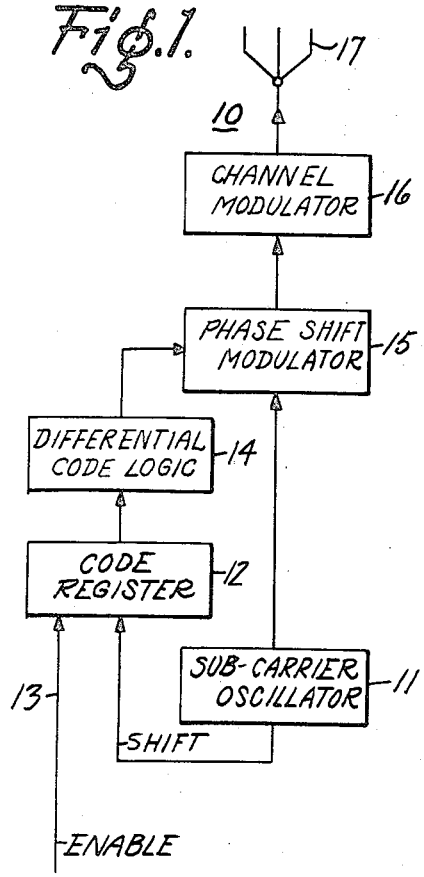
FIG. 1 illustrates a transmitting station according to the present invention.

Referring to FIG. 1, there is shown the transmitter portion 10 of the system in accordance with the present invention. The transmitter 10 serves to phase modulate the ancillary information, for example, vehicle identification, onto a sub-carrier which is then used to modulate the RF carrier which is ultimately transmitted. Specifically, in FIG. 1 the transmitter 10 comprises a sub-carrier oscillator 11 connected to a code register 12 which serves to count the output cycles of the oscillator 11 and is operative when enabled from enable line 13 to send pulses to differential code logic means 14 whose output is connected to the phase shift modulator 16. The pulses from differential code logic means 14 contain the identification code, for example, for a specific receiver. This code is encoded on the sub-carrier frequency by a differential phase shift keying technique in the phase shift modulator 15. The output of the phase shift modulator is then coupled to a channel or RF modulator 16 which serves to modulate the RF carrier frequency, which is then ultimately transmitted after suitable amplification over antenna 17. The modulation in this manner of the code sequence provides a continuous spectrum line in the transmitted spectrum which can be detected at the receiver and used simultaneously to de-code the code sequence and to provide a precise time of arrival for the waveform. While the resulting spectrum is devoid of energy at the sub-carrier frequency, significant energy is present at the second harmonic of the sub-carrier. This energy is utilized as discussed below.

Figure 2:
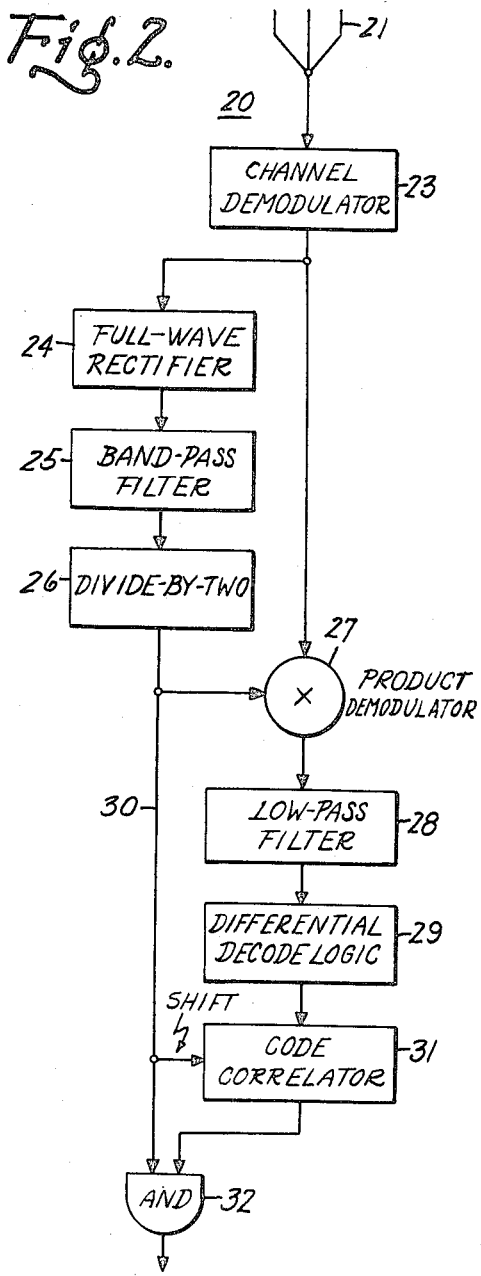
FIG. 2 illustrates a portion of a receiving station in accordance with the present invention.

A suitable receiving means for the transmitted waveform is illustrated in FIG. 2. Basically, the receiver 20 comprises a demodulator for demodulating the RF carrier signal and a parallel channel for simultaneously reconstructing the sub-carrier and extracting the ancillary information which has been encoded on the sub-carrier. In the specific examples used, the ancillary information comprises an identification code which serves to activate a specific receiver out of what can be a plurality of receivers receiving the transmitted signal.

Specifically, the receiving means 20 comprises an antenna 21 feeding a channel or RF modulator 23. The sub-carrier frequency is recovered by passing the modulator output through a full wave rectifier or square law device 24, a band-pass filter 25 and a divide-by-two circuit 26. The recovered sub-carrier signal is synchronous with the transmitted sub-carrier having been derived therefrom. The recovered or regenerated sub-carrier is then used to demodulate the received code waveform directly in product demodulator 27 which has as its input the demodulated RF signal from element 23. The output of the product demodulator 27 is passed through a low pass filter 28, a differential decode logic circuit 29 and a code correlator 31. The differential decode logic circuit 29 serves to extract the ancillary information which has been modulated onto the sub-carrier. This information is compared with stored information in the code correlator 31 to establish a correlation, if any, between the two informations. The recovered sub-carrier is passed to the "shift" input of the correlator to provide proper timing reference for the correlator. If there is correlation between the information from differential decode logic circuit 29 and the information stored within the correlator 31, an output signal is produced which is coupled as one input to coincidence sensing means 32, illustrated in FIG. 2 as comprising an AND circuit. The other input to the coincidence sensing means 32 is the recovered sub-carrier provided by the sub-carrier detection channel which comprises elements 24-26 and which couples the recovered sub-carrier signal to the coincidence sensing means 32 by way of line 30. A coincidence between the signals on line 30 and from correlator 31 indicates the time of arrival of the signal at antenna 21.

As can be seen from FIG. 2, the signal is simultaneously decoded and the time of arrival indicated by utilizing the sub-carrier that is transmitted with the received signal. Thus, there is no instrument delay involved as would be involved if a locally generated demodulating signal were utilized. The regenerated sub-carrier is in synchronism with the sub-carrier as transmitted. The signal from coincidence sensing means 32 may be used, for example, in a vehicle location system to initiate a precise time-of-arrival signal from the receiving station indicative of the fact that a signal having the proper code identification has been received. This may be done by any suitable means which are not shown as they do not form the part of the invention.

The channel or RF modulator and demodulator and the code correlator may comprise any suitable means. An example of a code correlator is a shift register having a plurality of weighted taps. When a particular coded signal is applied as input to the shift register, an output from the weighted taps of the register will achieve a maximum value, thereby indicating a correlation between the received signal applied to the shift register and the numerical value represented by the weighted taps on the shift register.

While a specific form of the invention has been described, it will be obvious to those of skill in the art that the principles of the present invention can be applied to a wide variety of uses.

What I claim as new and desire to secure by Letters Patent of the United States is:

1. A method of transmitting RF signals for signal arrive time determination comprising the steps of
   phase shift modulating a sub-carrier signal with encoded ancillary information,
   transmitting said ancillary information in a signal spectrum as a continuous spectral line, and
   simultaneously encoding said transmitted spectrum indicating the arrival time of said transmitted spectrum at a receiving station.

2. The method as set forth in claim 1 wherein said phase shift modulating step comprises:
   digitally encoding said ancillary information from a register onto said sub-carrier utilizing differential phase shift keying.

3. The method as set forth in claim 2 wherein said transmitting step comprises:
   modulating an RF carrier with said modulated sub-carrier signal; and
   transmitting said RF to said receiving station.

4. The method as set forth in claim 3 wherein said simultaneous decoding and determining comprise the steps of:
   receiving and reconstructing said sub-carrier signal from said transmitted RF to provide a synchronous demodulating signal;
   product demodulating the received signal with said synchronous demodulating signal to provide an information signal, and
   correlating said information signal with stored information to provide a correlation signal if correlation occurs; and
   coincidence detecting said correlation signal and said synchronous demodulating signal to provide an arrive time signal.

5. Apparatus for timing systems comprising:
   transmitting means for transmitting an RF signal having modulated thereon a phase shift modulated sub-carrier containing encoded ancillary information;
   receiving means for receiving and demodulating said transmitted RF signal; and
   parallel channel means for simultaneously decoding said encoded ancillary information and indicating the arrival time of said RF signal.

6. Apparatus as set forth in claim 5 wherein said parallel channel means comprises:
   detecting means for detecting and reconstructing said modulated sub-carrier;
   demodulator means coupled to said receiving means and said detecting means for product demodulating the demodulated RF signal to produce a signal containing said encoded ancillary information,
   means for decoding said information containing signal and correlating the information contained therein with stored information to produce a signal if correlation occurs; and
   coincidence sensing means coupled to said decoding and correlating means and to said detecting means for producing a signal indicative of arrival time.

7. Apparatus as set forth in claim 6 wherein said encoded ancillary information relates to vehicle location.

* * * * *